(12) United States Patent
Schmidt

(10) Patent No.: US 7,905,342 B2
(45) Date of Patent: Mar. 15, 2011

(54) SUPPLY UNIT

(76) Inventor: Heiko Schmidt, Lappersdorf (DE)

( * ) Notice: Subject to any disclaimer, the term of this patent is extended or adjusted under 35 U.S.C. 154(b) by 211 days.

(21) Appl. No.: 12/385,443

(22) Filed: Apr. 8, 2009

(65) Prior Publication Data

US 2009/0255779 A1 Oct. 15, 2009

(30) Foreign Application Priority Data

Apr. 8, 2008 (DE) .................... 20 2008 004 870 U
Jul. 9, 2008 (DE) .................... 20 2008 009 174 U

(51) Int. Cl.
*B65G 47/14* (2006.01)

(52) U.S. Cl. ......... 198/540; 198/750.1; 221/29; 221/268

(58) Field of Classification Search ................ 198/383, 198/459.6, 463.2, 528, 540, 736, 750.1; 221/29, 221/232, 268, 279; 414/794.4, 797.6
See application file for complete search history.

(56) References Cited

U.S. PATENT DOCUMENTS

| | | | | |
|---|---|---|---|---|
| 3,460,217 A | * | 8/1969 | Leistner | 29/33 R |
| 4,773,156 A | * | 9/1988 | Kurita | 29/783 |
| 4,949,833 A | * | 8/1990 | Sakamoto et al. | 198/358 |
| 5,007,795 A | * | 4/1991 | Yoshimura | 414/737 |
| 5,762,712 A | * | 6/1998 | Sohn | 118/419 |
| 6,254,332 B1 | * | 7/2001 | Miura et al. | 414/797.4 |
| 6,558,245 B2 | * | 5/2003 | Abe et al. | 453/57 |
| 6,774,318 B2 | * | 8/2004 | Beal et al. | 177/105 |
| 7,222,720 B2 | * | 5/2007 | Truyens | 198/471.1 |
| 7,398,896 B2 | * | 7/2008 | Morgan | 221/270 |
| 7,753,230 B2 | * | 7/2010 | Kusano | 221/278 |

* cited by examiner

*Primary Examiner* — Douglas A Hess
(74) *Attorney, Agent, or Firm* — Welsh, Flaxman & Gitler LLC

(57) ABSTRACT

A supply unit including a funnel-shaped container for receiving a quantity of unsorted, or randomly oriented, nuts and bolts, a conveyor that is driven, in a reciprocating manner, along an inwardly tapering interior wall of the container. The upper carrying surface of the conveyor dips into the unsorted nuts and bolts on its downward stroke and picks up some of the nuts and bolts. On its upward stroke, or travel, the conveyor cooperates with the adjacent wall to properly orient the majority of the nuts and bolts. Some of the improperly oriented nuts and bolts may fall off the conveyor during its upward travel. Blasts of air, or mechanical deflectors, cause other improperly oriented nuts and bolts to fall back into the container. A step is formed near the top of the container, and the upward travel of the conveyor term mates above the step. The properly oriented nuts and bolts are transferred away from the container by a transport assembly located in proximity to the step. The transport assembly includes an endless belt, and a guide for maintaining the sorted nuts and bolts in proper orientation.

10 Claims, 4 Drawing Sheets

SUPPLY UNIT

FIELD OF THE INVENTION

The invention relates to a supply unit for properly positioning and feeding nuts and bolts retained in a container to a processing unit.

BACKGROUND OF THE INVENTION

Supply units of this type are also known in the art as "step conveyors" and are used to convey mechanical components, which are placed in a holder, or a container, of the supply unit as a randomly oriented or unsorted quantity of components. A conveyor moves up and down relative to the holder, and extracts individual components from the holder and delivers same to a transport element adjacent to the upper end, of the holder. The component parts can then be supplied, via a transport element to a processing unit for further utilization.

The conveyor is moved with a conveying, or carrying, surface along an inner surface of the holder, so that the component parts carried along with the conveyor are supported, so that they slide on both the conveying and carrying surface and on the inner surface of the holder. The design of the conveyor insures that only component parts which are correctly oriented, and/or positioned, are transferred by the conveyor element to the area of the transport element, and are discharged onto the transport element.

In supply units known in the art, the transport element for removing the component parts from the supply unit is generally a vibration conveyor designed as a linear conveyor. The slow transport speed of such vibration conveyors is a marked disadvantage, for relatively long cycle times are needed to transport the component parts discharged by the conveyor to a transport element or to a transfer area. The long cycle time limits the capacity of a supply unit (the number of component parts transported away with the transport element per unit of time).

SUMMARY OF THE INVENTION

An object of the invention is to present a supply unit, that overcomes the disadvantage of low capacity associated with step conveyors, makes it possible to provide component parts at a high capacity for further utilization.

In the supply unit according to the invention, components are raised from an unordered quantity by the carrying surface defined on the conveyor. The components are then transferred to the transport assembly. The transport assembly is provided with at least one circulating drivable belt or chain, with which the components are transported, at high speed, from the transfer area of the supply unit. The supply unit can operates at high capacity in concert with a reciprocating conveyor that moves up and down at an high speed.

Further embodiments, advantages and possible applications of the invention are disclosed in the following description of exemplary embodiments and of the drawings. All characteristics described and/or depicted alone or in any combination are fundamentally the subject of the invention, regardless of any summarization in the claims or any direct reference. The content of the claims is also incorporated into the description.

DETAILED DESCRIPTION OF THE INVENTION

Figure 1:
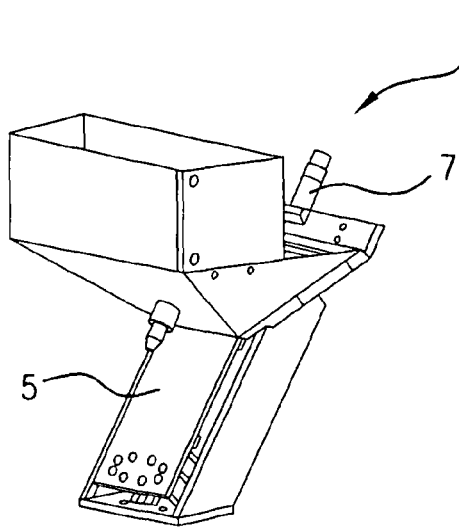
FIG. 1 is a perspective view of a supply unit for feeding nuts to a processing unit, the supply unit being constructed in accordance with the principles of applicant's invention.
Figure 2:
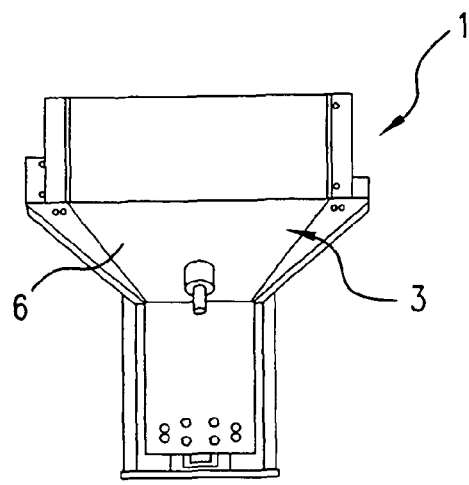
FIG. 2 is a front view of the supply unit of FIG. 1.
Figure 3:
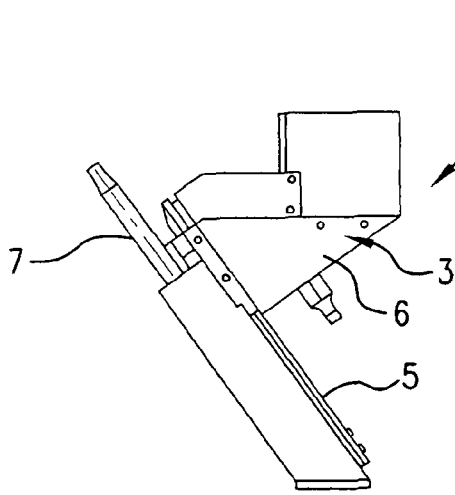
FIG. 3 is a side view of the supply unit of FIG. 1.

The supply unit 1 depicted in FIGS. 1-7 is used for feeding nuts 2 (e.g. rivet nuts) to a unit (not shown) for processing said nuts, for example to a punching head (not shown) for inserting the nuts 2 into existing workpieces made of sheet metal. The nuts 2 consist, in the depicted embodiment, of a cylindrical body 2.1, which has a continuous threaded bore, and a rivet collar 2.2 on its front face. After the collar 2.2 has been inserted into an opening of the respective workpiece for anchoring of the nut 2 therein, the collar is deformed by riveting or pressing and has a reduced diameter in comparison with the body 2.1.

The supply unit 1 comprises a container 3 with side walls 3.1, and front wall 3.2 that taper toward the bottom in the manner of a funnel. Interior 4 of container 3 holds an unordered or unsorted quantity of nuts 2. Body 5.1 in conveyor element 5, extends through an opening in the container bottom 6 into the interior 4 of the container. Conveyor 5 can move up and down in a clock pulsed manner by means of a drive unit. The drive unit assumes the form of a pneumatic cylinder provided outside of the container 3 on the back of the supply unit 1, as indicated by the double arrow A in the drawings. The carrying section 5.1 of carrier 5 is reciprocated along the inner surface of a vertically angled rear wall 8, or wall section 8.1 of said rear wall 8, of the container 4. Consequently, with each downward movement of the conveyor element 5 into the nuts 2 held in the container 3, the upper surface 5.2 is oriented perpendicular, or essentially perpendicular, to the inner surface of the wall section 8.1 of container 3. Surface 5.2 extends in a horizontal direction, and with each upward movement carries along a quantity of nuts 2 corresponding to the width of the conveyor 5, or the width of the upper surface 5.2 of the conveyor. The nuts 2 carried upward by the conveyor 5 are oriented randomly to some extent, so that they lie with their front face 2.3 facing away from the rivet collar 2.2 against the inner surface of the rear wall 8, which corresponds to a "correct" orientation, or so that they lie with their rivet collar 2.2 against the inner surface of the rear wall 2. In any case, the nuts 2 carried by the conveyor element 5 are oriented respectively with their axis perpendicular, or essentially perpendicular, to the inner surface of the rear wall 8. All nuts 2 that are randomly oriented differently are not carried along by the conveyor element 5 or, after the upper surface 5.2 emerges from the supply of nuts held in the container 3, fall off the surface 5.2.

The nuts carried upwardly by conveyor 5 finally arrive at a step 8.2 formed on the rear wall 8 of container 3. Step 8.2 extends in horizontal direction as does the upper surface 5.2 of conveyor 5, i.e. perpendicular to the plane of projection in FIG. 6 but is slightly angled horizontally in cross direction. Thus, nuts 2 carried by the conveyor 5, due to the force of gravity, slide sideways from the upper surface 5.2 onto the step 8.2 and then lie either with the front face 2.3 or with the rivet collar 2.2 against the flat inner surface of the continuation 8.3 of the rear wall 8 adjoining the step 8.2. To ensure reliable transfer of the nuts 2 from the upper surface 5.2 of the conveyor 5 onto the step 8.2, the stroke of the conveyor element 5 is adjusted so that in the topmost position of the stroke movement, the upper surface 5.2 is somewhat above the step 8.2. A transport assembly is operative with step 8.2, so that the nuts 2 transferred to the step 8.2 are moved at an accelerated rate to the side, i.e. in horizontal direction away from the area to which nuts 2 were conveyed by conveyor 5.

Figure 4:
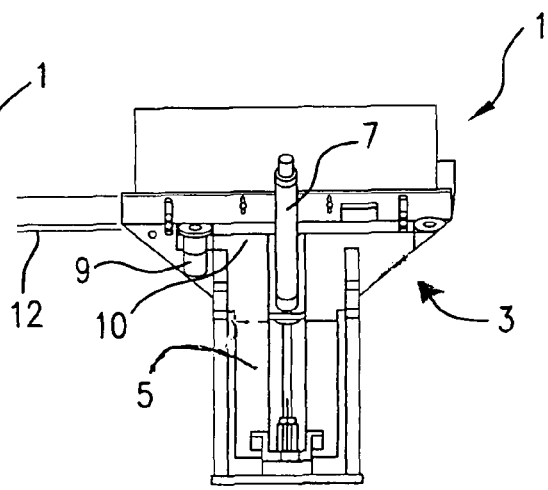
FIG. 4 is a rear view of the supply unit of FIG. 1.
Figure 5:
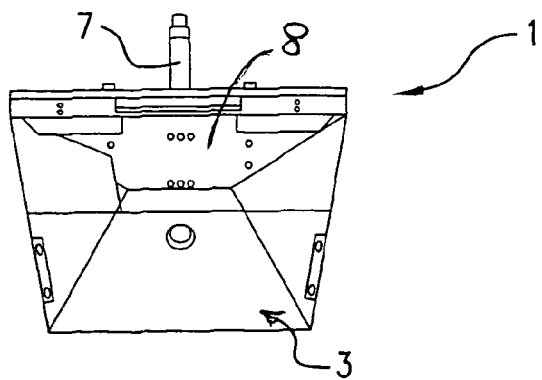
FIG. 5 is a top view of the supply unit of FIG. 1.

The transport assembly, together with step 8.2 and the section 8.3 of rear wall 8 forms an inner transport route 11, transport belt 10 driven by motor 9, as shown in FIG. 4. The upper length 10.1 of transport belt is located in the area of the step 8.2 and forms a bearing surface for the nuts 2 conveyed or delivered to step 8.2 by conveyor 5. The transport belt 10 is continuously driven, at such a speed that, whenever the upper surface 5.2 of conveyor 5 reaches its top stroke position, the nuts 2 from a previous operation of conveyors have been cleared, or transported away, from step 8.2.

The nuts 2 transported away by length 10.1 of transport belt 10 in the horizontal direction from the area of the conveyor 5 arrive in an outer guide 12 adjoining step 8.2. Guide 12 supplies nuts 2 to a machine (not shown) for further utilization.

To ensure that only correctly oriented nuts 2, i.e. such nuts that lie with their front face 2.3 adjacent to the rear wall 8 or the section 8.3 of said rear wall, arrive in guide 12, means are provided to cause the incorrectly oriented nuts 2 to fall back into container 3. In the embodiment depicted in FIG. 6, air outlet openings 13 are provided in the area of the internal transport route formed by step 8.2 and upper transport belt length 10.1 on the inner surface of the section 8.3 of rear wall 8. The air current escaping from the openings 13 is adjusted so that correctly oriented nuts 2 that lie with their front faces 2.3 on the inner surface of the section 8.3 are returned there by the air current, while incorrectly oriented nuts 2 that lie with their rivet collar 2.2 against the inner surface of the section 8.3 are blow away by the air current and therefor fall back into the container 3 and/or into the unordered, unsorted quantity of nuts 2 thereon.

Deflector 14 is provided above step 8.2 and adjoining surface 8.3 to ensure that nuts 2, that are positioned randomly above the nuts 2 lying on step 8.2, are thrown off and likewise fall back into container 3.

Figure 6:
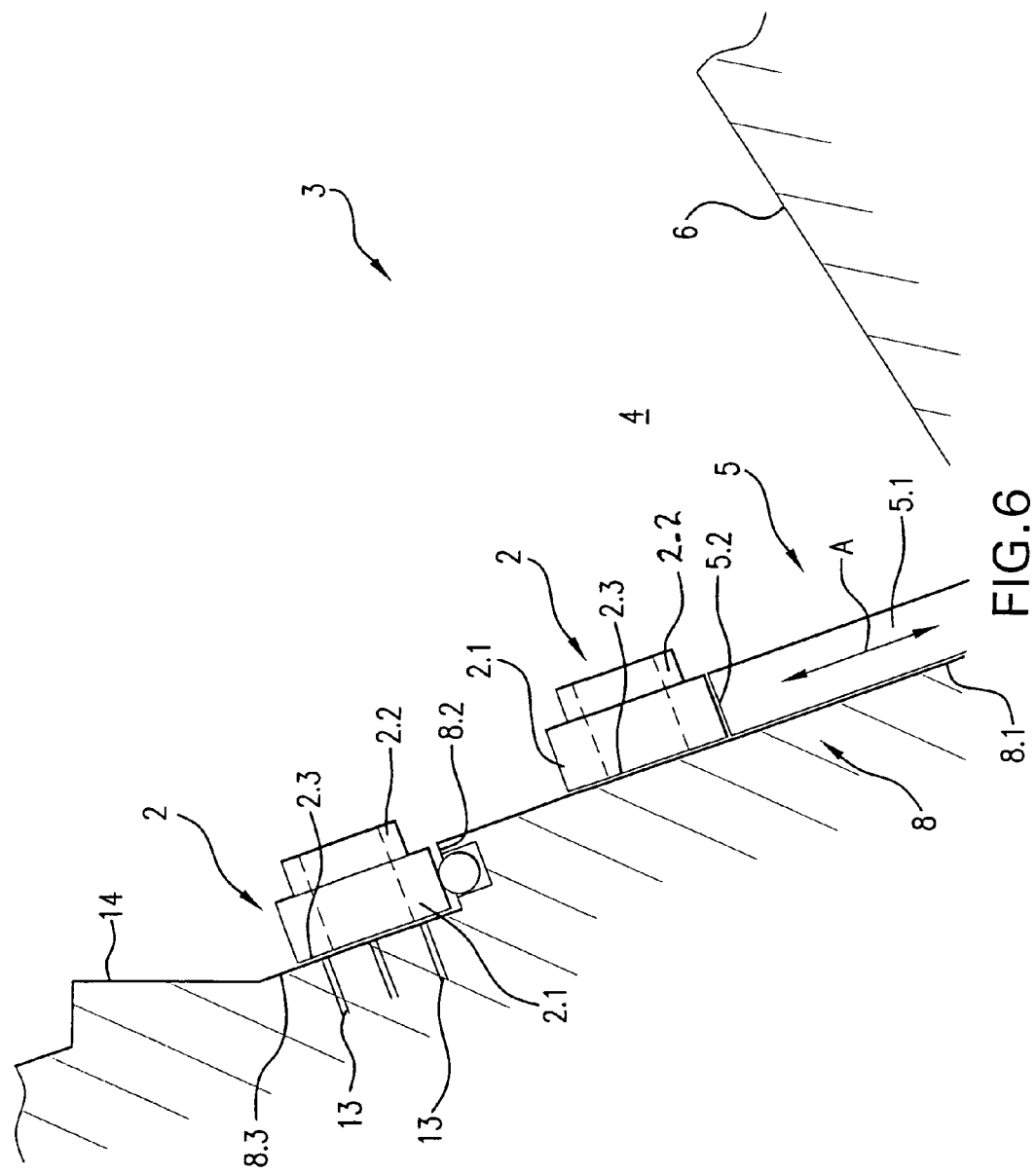
FIG. 6 is a fragmentary side view, on an enlarged scale, of the conveyor, for the supply unit, carrying nuts.
Figure 7:
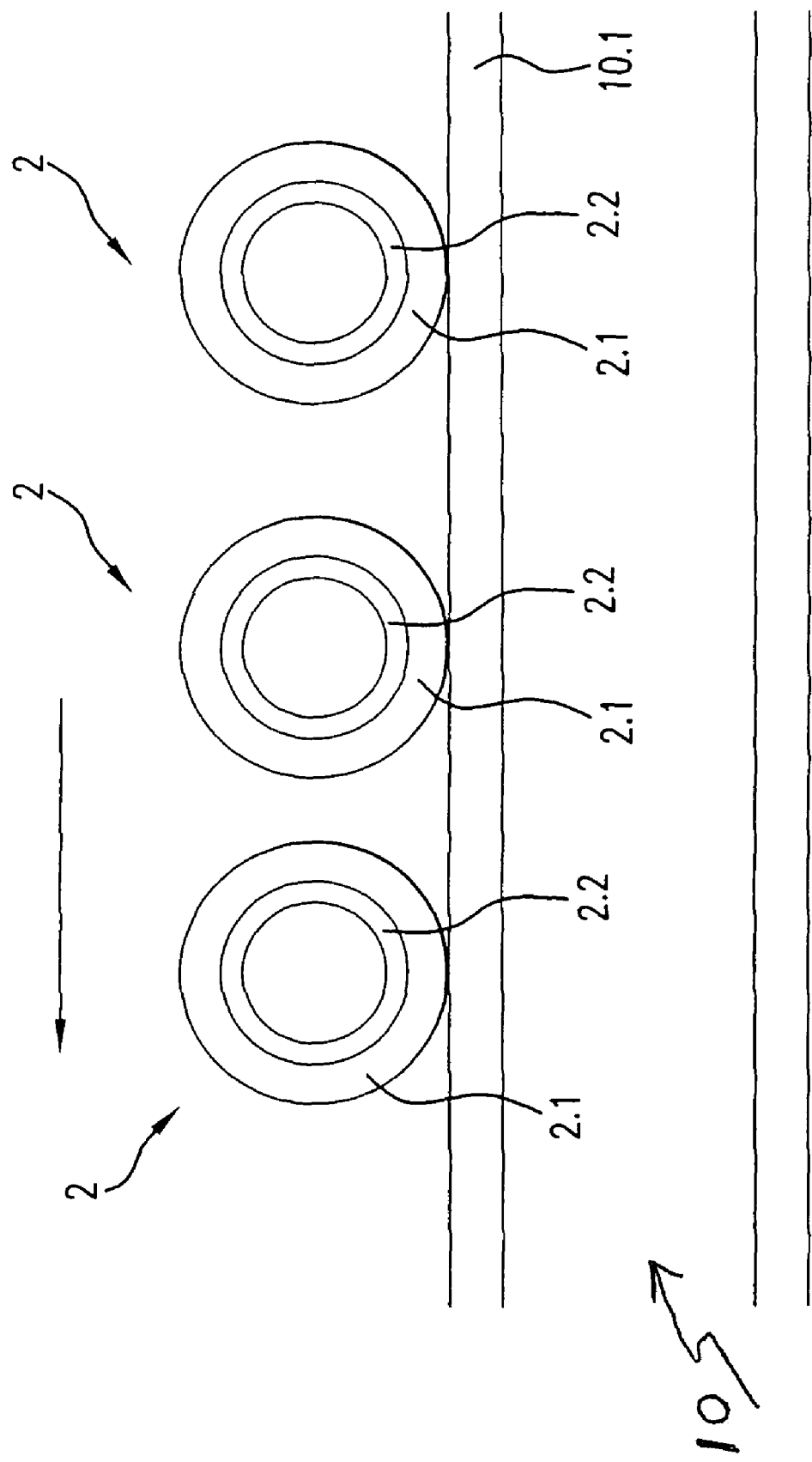
FIG. 7 shows the transfer area in a side view.
Figure 8:
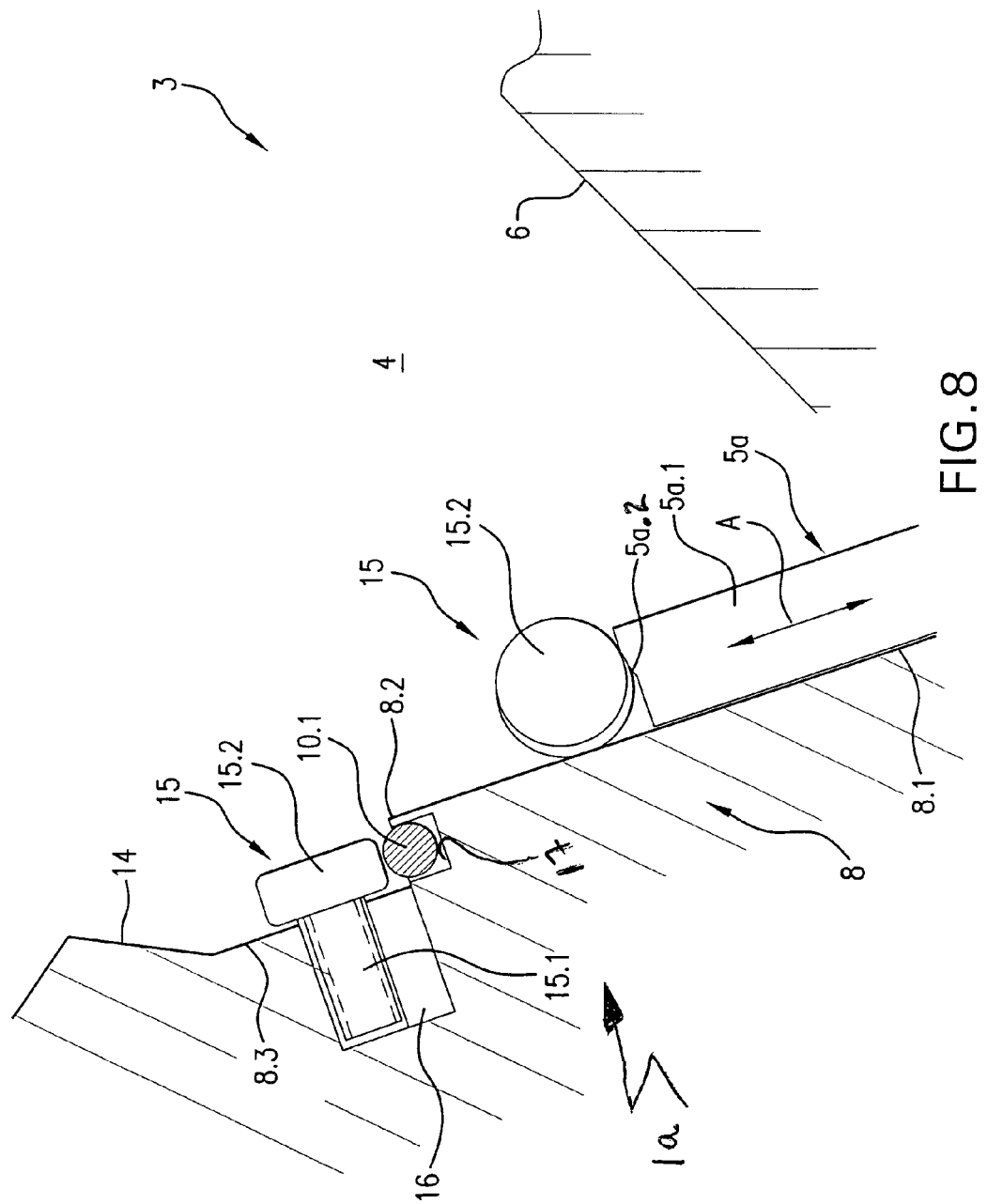
FIG. 8 shows a view similar to FIG. 6, wherein the conveyor is carrying threaded bolts.

FIG. 8 shows, in a depiction similar to FIG. 6, a supply unit 1a, which is used to supply bolts 15 to a processing unit. The bolts 15 consist respectively of a bolt shank 15.1, which may be provided with outer threads, and a bolt head 15.2. The supply unit 1a differs from the supply unit 1 essentially only in that the conveyor 5a, corresponding to the conveyor element 5, has a somewhat larger width, at least on the surface 5a.2, in the axis direction perpendicular to the wall section 8.1 of the rear wall 8. Several bolts 15 can be accommodated thereon, i.e. oriented with their bolt axis parallel, or at an angle to the inner surface of the wall section 8.1, and lying with the bolt head 15.2 and the free end of the bolt shank 15.1 on the surface 5a.2. The conveyor element 5a reliably transports a plurality of bolts 15 from the quantity of bolts held in the interior 4 of the container upward to step 8.2. The bolts are returned, respectively, with their bolt head 15.2 and with the free end of their bolt shank 15.1 in the angle formed between the angled surface 8.1 and the surface 5a.2. The width of the surface 5a.2 is smaller than the diameter of the bolt head 15.2, but larger than the radius of the bolt head 15.2. The wall section 8.3 adjoining the step 8.2 in this embodiment is provided with a recess 16 for the shank 15.1 of a bolt 15. A majority of the bolts 15 transported upward are slewed by the force of gravity so that bolt shank 15.1 fits into the recess 16, due to the angled position of the wall section 8.1.

The drive unit for the up and down motion (double arrow A) of the conveyor 5 is designed so that, in the upper stroke position of the conveyor, the surface 5a.2 is at least at the same level, but preferably slightly above the bottom surface of the recess 16. During the return movement of the conveyor 5a from its upper stroke position, bolts 15, which extend with bolt shank 15.1 into the recess 16 and are oriented perpendicular or essentially perpendicular to the wall section 8.3, lie with bolt head 15.2 on length 10.1 of the transport belt and are thereby transported away, at an accelerated rate, from the area of the step 8.2.

The step 8.2 and the wall section 8.3 with the recess 16 and the transport belt 10 likewise form an inner transport system. Obviously, the adjoining outer guide for further transport of the bolts 15 to the processing unit likewise features a recess 16 for the bolt shanks 15.1, at least over a partial area.

The supply unit described above, is susceptible of modifications and variations that will occur to the skilled artisan. Consequently, the appended claims should be broadly construed in a manner consistent with the spirit and scope of applicant's invention, and should not be limited to their literal terms.

What is claimed is:

1. A supply unit adapted to withdraw a plurality of mechanical fasteners from an unsorted quantity thereof, said fasteners comprising an enlarged head and a shank, said supply unit comprising:
   a) a container including a front wall, a rear wall, and side walls,
   b) said front wall, said rear wall, and said side walls tapering inwardly to define a funnel,
   c) a bottom extending across said funnel, and adapted to receive an unsorted quantity of mechanical components,
   d) a conveyor movable along the interior of said rear wall of said container,
   e) said conveyor including a body with an upper carrier surface, which extends across the rear wall of said container,
   f) a drive unit secured to said rear wall for moving said conveyor in a reciprocal manner within said container,
   g) a step defined in said rear wall of said container,
   h) an opening in the bottom of said container,
   i) said drive unit moving said conveyor downwardly through said opening so that said upper surface contacts several unsorted mechanical fasteners,
   j) said drive unit subsequently moving said conveyor upwardly along said rear wall so that said upper carrying surface withdraws several mechanical fasteners from the unsorted fasteners,
   k) the upward movement of said conveyor terminating in proximity to said step,
   l) a transport assembly located in proximity to said step for transferring the mechanical fasteners delivered to said step away from the supply unit for further processing.

2. The supply unit of claim 1, wherein said drive unit comprises a pneumatic cylinder located on the exterior of said rear wall.

3. The supply unit of claim 1, wherein said upper carrying surface of said conveyor and said inwardly tapering rear wall of said container cooperate to properly orient the mechanical components retained on said carrying surface of said conveyor during the upward travel of said conveyor and prior to reaching said step.

4. The supply unit of claim 3, wherein air currents, issuing from said rear wall of said container at a location above said step, blow improperly oriented fasteners back into said container.

5. The supply unit of claim 3, wherein a deflector is located in said rear wall of said container above said step, said deflector pushing improperly oriented fasteners back into said container.

6. The supply unit of claim 1, wherein a recess is formed in said rear wall of said container above said step.

7. The supply unit of claim 1, wherein said conveyor is rectangular in shape, and said upper carrying surface is flat.

8. The supply unit of claim 1, wherein said conveyor is rectangular in shape, and said upper carrying surface is divided into two levels, one level being slightly higher than the other level.

9. The supply unit of claim 1, wherein said transport assembly extends through said rear wall into said container.

10. The supply unit of claim 9, wherein said transport assembly comprises an endless belt, a motor driving same, and a guide for maintaining the fasteners in the proper orientation during transfer away from said supply unit.

* * * * *